United States Patent [19]
Onishi et al.

[11] Patent Number: 5,494,331
[45] Date of Patent: Feb. 27, 1996

[54] CHILD SAFETY SEAT FOR AUTOMOBILE

[75] Inventors: Ichiro Onishi; Kenzou Kassai, both of Osaka, Japan

[73] Assignee: Aprica Kassai Kabushikikaisha, Osaka, Japan

[21] Appl. No.: 262,233

[22] Filed: Jun. 20, 1994

[30] Foreign Application Priority Data

Jun. 30, 1993 [JP] Japan .................................. 5-161898

[51] Int. Cl.⁶ ..................................................... B60N 2/28
[52] U.S. Cl. .................... 297/256.13; 297/317; 297/321; 297/322
[58] Field of Search ............................... 297/256.13, 317, 297/320, 321, 322, 325, 329, 344.1

[56] References Cited

U.S. PATENT DOCUMENTS

| | | | |
|---|---|---|---|
| 3,232,574 | 2/1966 | Ferro | 297/329 X |
| 4,709,960 | 12/1987 | Launes | 297/329 X |
| 4,971,392 | 11/1990 | Young | 297/256.13 X |
| 5,183,312 | 2/1993 | Nania . | |

FOREIGN PATENT DOCUMENTS

| | | |
|---|---|---|
| 1002003 | 5/1990 | Belgium . |
| 0447097 | 9/1991 | European Pat. Off. . |
| 2692851 | 12/1993 | France . |
| 9201796 | 5/1992 | Germany . |
| 2202433 | 9/1988 | United Kingdom . |

*Primary Examiner*—Peter R. Brown
*Attorney, Agent, or Firm*—W. G. Fasse; W. F. Fasse

[57] ABSTRACT

A seat body forming a backrest and a seat section is made to move along an arcuate guide with respect to a base by a relative movement guiding mechanism which is formed by combination of an arcuate guide rail and a guide member moving along the guide rail. A seat section is rotatably mounted on the seat body and a coupling member is caused to engage a linear section of the guide rail, thereby maintaining the seat section at a substantially constant inclination regardless of any movement of the seat body. Thus, it is possible to maintain the seat section in a substantially horizontal state also when the angle of the backrest is adjusted, whereby the backrest can recline without interfering with a backrest of the car seat in an automobile. Thus, an uncomfortable position is avoided when a child sits in the safety seat the backrest of which is in an inclined state.

9 Claims, 6 Drawing Sheets

CHILD SAFETY SEAT FOR AUTOMOBILE

FIELD OF THE INVENTION

The present invention relates to a child safety seat for an automobile. Such a seat is mounted on an original adult seat of an automobile for safely seating a child in the automobile. More particularly, the invention relates to an improvement in a reclining mechanism of such a child safety seat for an automobile.

BACKGROUND INFORMATION

There is a child safety seat for an automobile which comprises a reclining mechanism for keeping a child in a comfortable position when it falls asleep on the seat, for example. Such a seat typically has a reclinable backrest portion. However, when such a safety seat is mounted on an original front seat of the automobile and the angle of the backrest is adjusted, the child seat backrest interferes with the backrest of the original seat of the automobile. Therefore, the position for mounting the child safety seat on the original seat of the automobile must be changed every time the angle of the backrest is adjusted. In order to avoid such a trouble in the adjustment of the angle of the backrest, there has been proposed another child safety seat for an automobile comprising a reclining mechanism having a structure including a base which is fixed to an original seat of an automobile, and a seat body which is movably held by the base. The base is provided with a guide rail arcuately extending in a vertical plane, while the seat body is provided with a guide member which is guided to move along the guide rail. Thus, it is possible to change the angle of inclination of the seat body without interfering with the original seat of the automobile.

The aforementioned seat body is provided with a backrest and with a seat in a fixed manner. Therefore, when the seat body is inclined to adjust the angle of the backrest, a forward end of the seat is also raised.

In such a state, however, the knees of the child are drawn up to apply a relatively large load on its hips, although the child can recline the upper half of its body against the backrest.

SUMMARY OF THE INVENTION

Accordingly, it is an object of the present invention to prevent a front end of a seat portion from being raised upon adjustment of an angle of a backrest portion in a child safety seat for an automobile having the second reclining structure described above.

A child safety seat for an automobile according to the present invention comprises a seat body forming a backrest, a seat tiltably mounted on the seat body, and a base movably holding the seat body. The base and the seat body are coupled with each other by a relative movement guiding mechanism comprising a combination of a guide rail arcuately extending in a vertical plane and a guide member guided to move along the guide rail. The relative movement guiding mechanism further comprises a locking mechanism for selectively fixing the guide member in any one of a plurality of positions of the guide rail. The mechanism further comprises a coupling for coupling the base and the seat with each other to maintain the seat in a substantially constant inclination regardless of any movement of the seat body.

According to the present invention, the seat body moves along an arcuate track with respect to the base. Thus, when the angle of the backrest is adjusted while the base is fixed to an original seat of an automobile, the seat body will not interfere with a backrest of the original seat of the automobile.

According to the present invention, the seat is tiltably mounted on the seat body, while the base and the seat are coupled with each other by the coupling so that the seat is maintained, in a substantially constant inclination, regardless of the angle of the backrest adjustment, whereby the forward end of the seat portion is not raised to force the child into an uncomfortable position when the angle of the backrest is adjusted. Thus, the child can recline its body on the backrest portion, to take a nap in a comfortable position.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
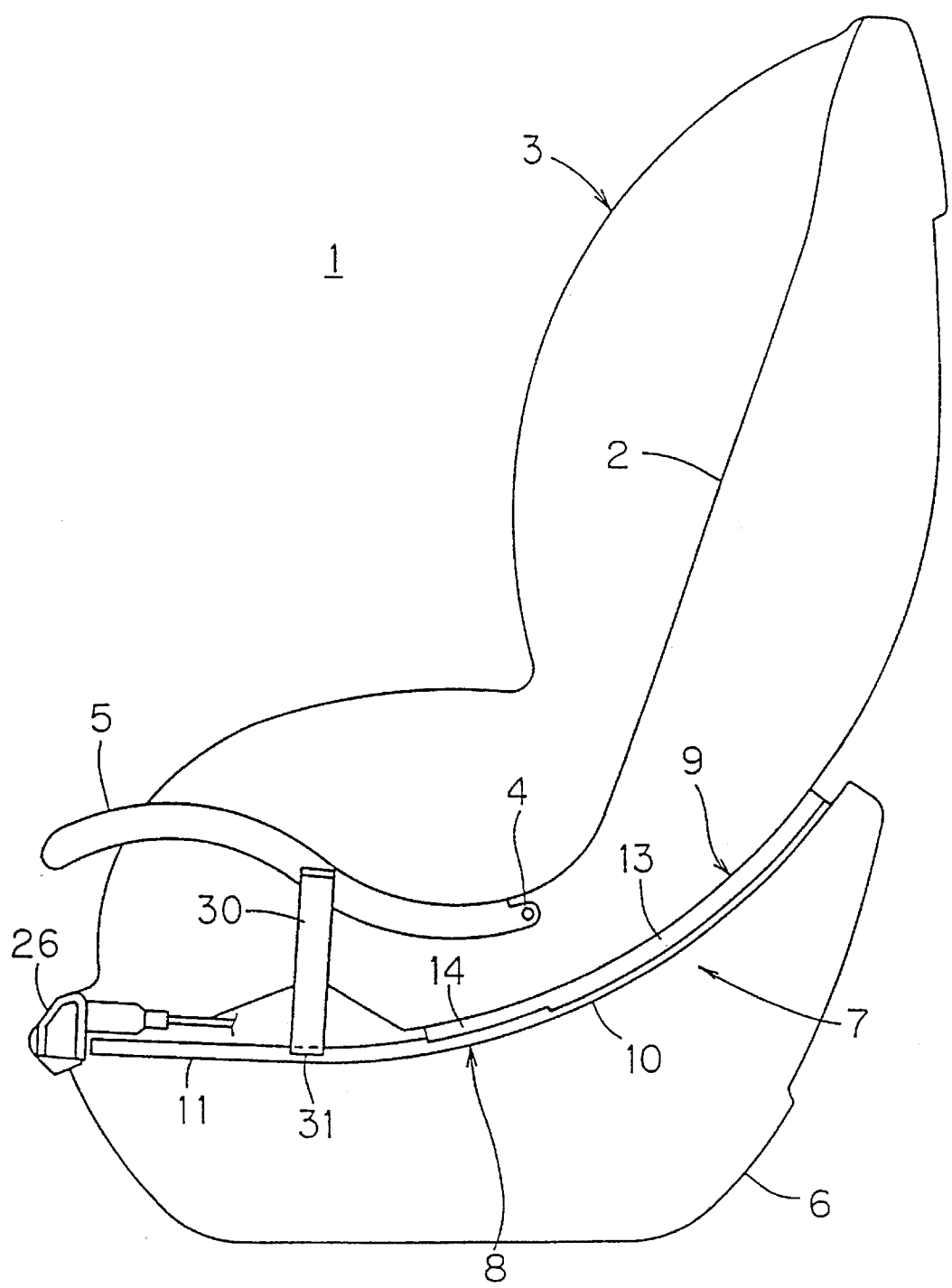
FIG. 1 shows a schematic vertical section through a child safety seat for an automobile according to an embodiment of the present invention as viewed from a side with a seat body in a normal position.
Figure 2:
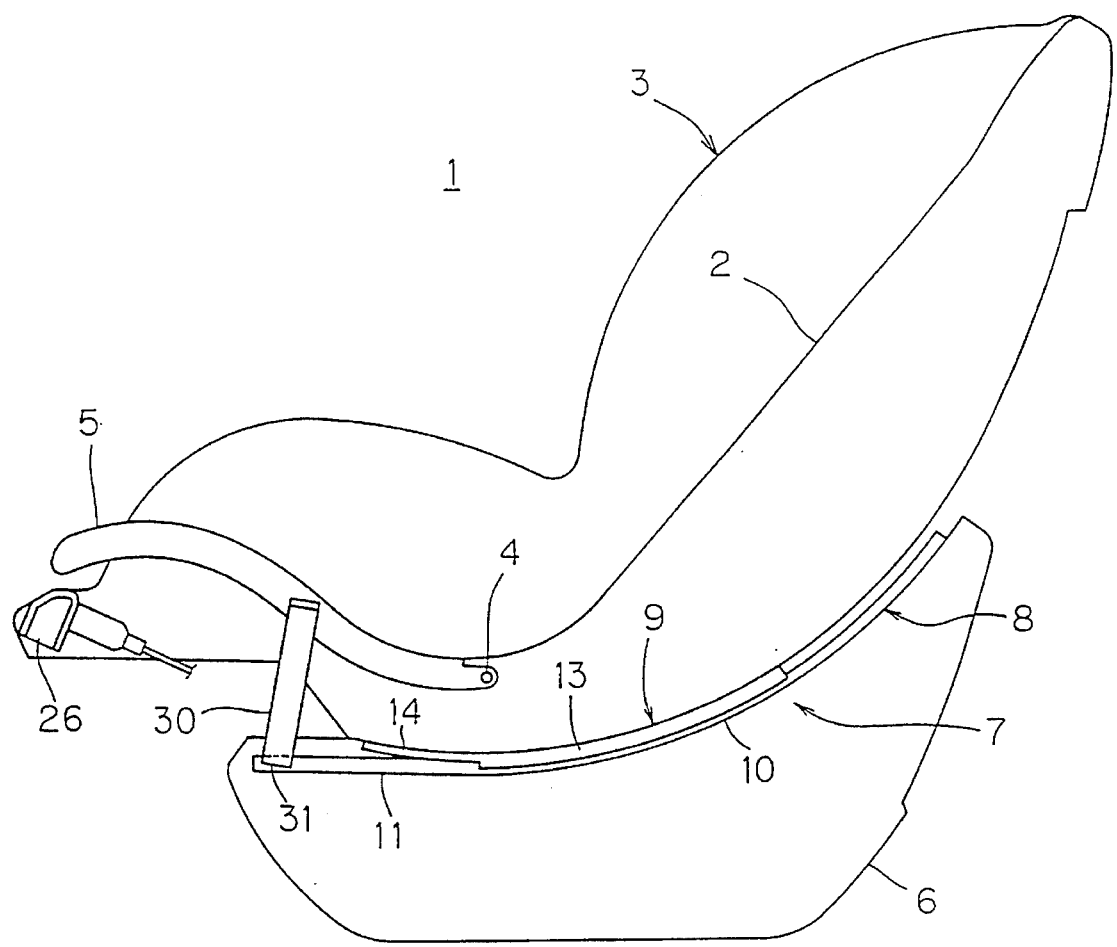
FIG. 2 is a view corresponding to FIG. 1, but showing the seat body in an inclined position with respect to a base.

FIGS. 1 and 2 are vertical sectional views schematically showing a child safety seat 1 for an automobile according to an embodiment of the present invention. A cushion member, a cover member etc. which are generally provided in such child safety seats are not shown in these figures.

This safety seat 1 comprises a base 6 supporting a seat body 3 forming a backrest 2 and a seat section 5 mounted on the seat body 3 by a journal or pivot 4 to be tiltable about the pivot 4. The base 6 movably holds the seat body 3. The base 6 can be fixed to a car seat in an automobile by a safety belt or the like which is already provided on the car seat.

As hereinabove described, the seat body 3 and the base 6 movably holding the body 3 are coupled with each other by a coupling forming a relative movement guiding mechanism 7 including a combination of a guide rail 8 and a guide member 9. According to this embodiment, the guide rail 8 is secured to the base 6 and the guide member 9 is secured to the seat body 3.

Figure 3:
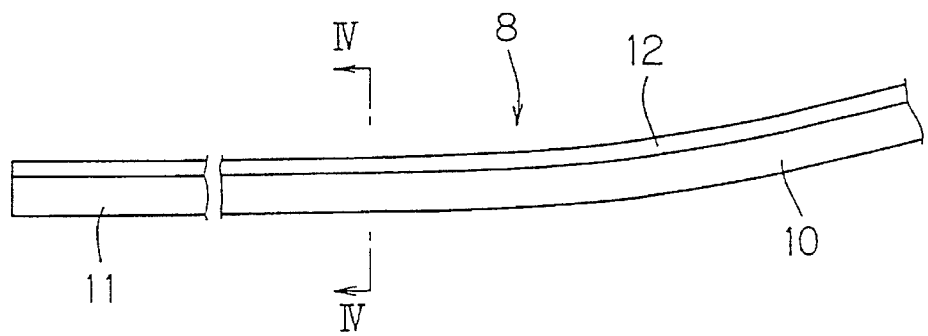
FIG. 3 is an enlarged view showing a part of a guide rail for the present seat.
Figure 4:
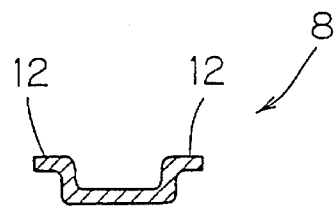
FIG. 4 is a sectional view taken along the line IV—IV in FIG. 3.

The guide rail 8 comprises an arcuate or curved section 10 and a linear section 11 extending from one end of the arcuate section 10. FIG. 3 shows a part of the guide rail 8 on an enlarged scale. FIG. 4 shows that the guide rail 8 has a U-shaped section as a whole, with extension edges 12 provided on both sides thereof.

Figure 5:
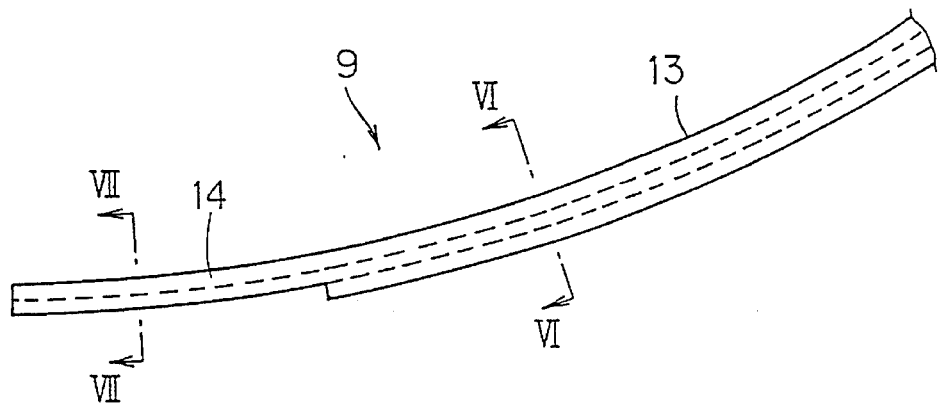
FIG. 5 is an enlarged view showing a part of a guide member for the present seat.
Figure 6:
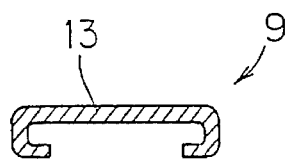
FIG. 6 is a sectional view taken along the line VI—VI in FIG. 5.
Figure 8:
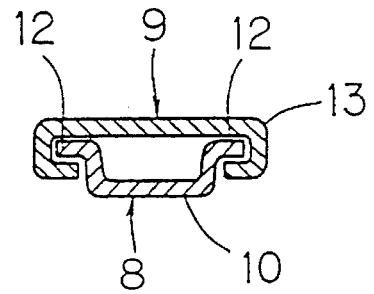
FIG. 8 is a sectional view showing the guide rail and the guide member in engagement with each other.

Referring to FIGS. 5 and 6, the guide member 9 arcuately extends in correlation with the arcuate section 10 of the aforementioned guide rail 8. As shown in FIG. 6, a main part 13 of the guide member 9 has a laterally open C-shaped section for engaging the edges 12 of the guide rail 8 as shown in FIG. 8. Thus, the guide member 9 can move along the guide rail 8.

Figure 7:
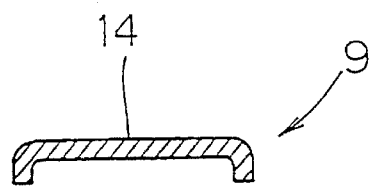
FIG. 7 is a sectional view taken along the line VII—VII in FIG. 5.

An end 14 of the guide member 9 has a section as shown in FIG. 7, not to engage with the guide rail 8. While such an end 14 is adapted to reinforce the seat body 3, it is not particularly necessary to form the same.

The relative movement guiding mechanism 7 comprises a locking device for selectively fixing the guide member 9 in a plurality of positions of the guide rail 8. According to this embodiment, the selective locking device has the following structure.

Figure 9:
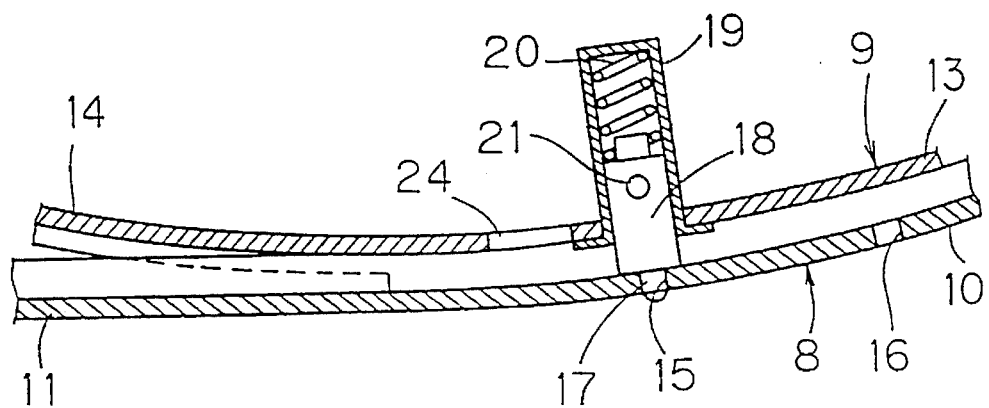
FIG. 9 is a sectional view showing a locking member cooperating with the guide member.
Figure 10:
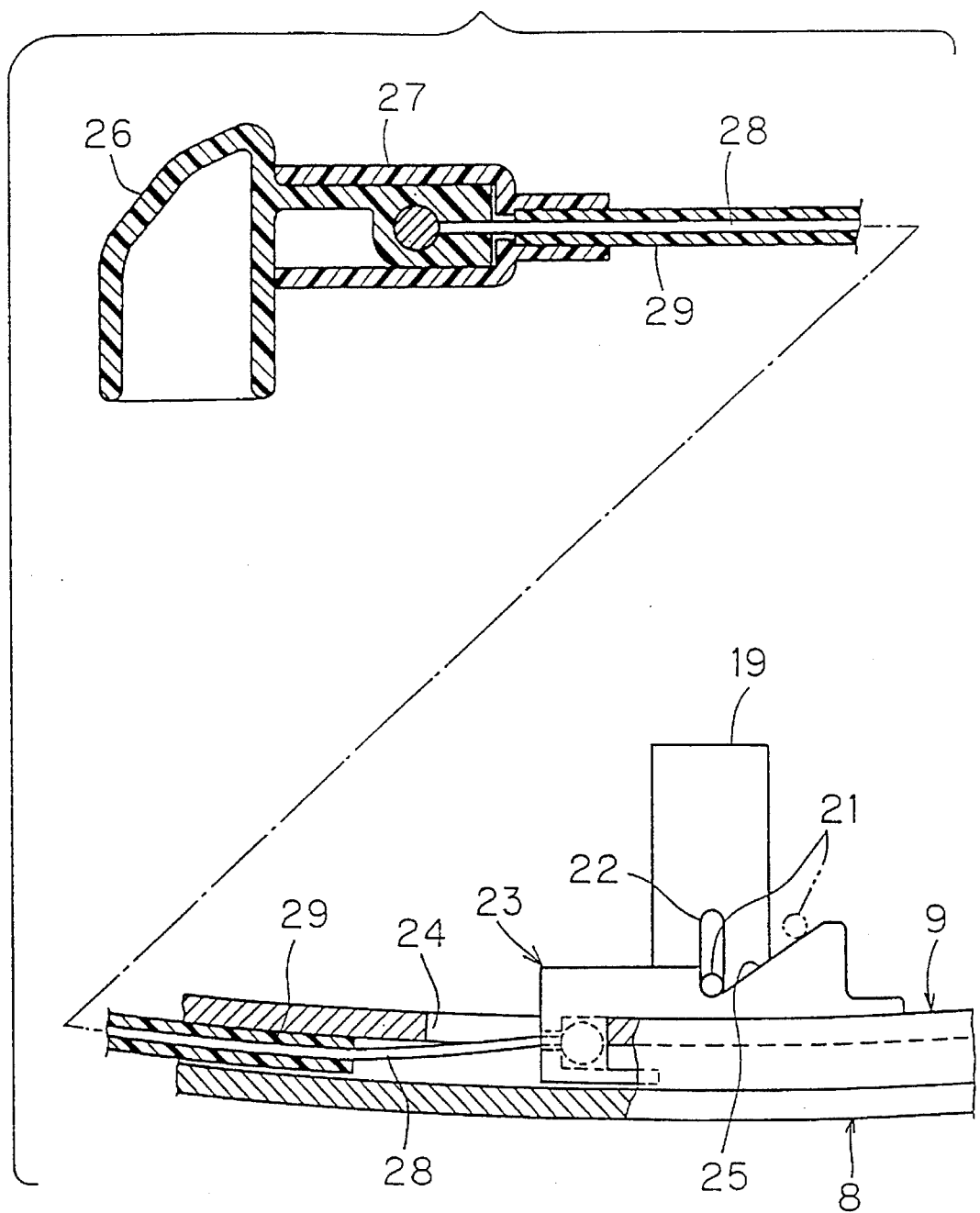
FIG. 10 is a sectional view showing a structure for controlling the movement of the locking member shown in FIG. 9.

Referring to FIG. 9, the guide rail 8 has a plurality of engaging holes 15, 16, . . . which are distributed along the length of the guide rail. The guide member 9 holds a locking member 18 having an engaging projection 17 which is insertable in any one of the engaging holes 15, 16. The locking member 18 is movably guided in a guide case 19 which is fixed to the guide member 9. A spring 20 urges the projection 17 to move into any one of the engaging holes 15, 16. As shown in FIGS. 9 and 10, the locking member 18 is provided with an engaging pin 21 passing through a slot 22 in the guide case 19, whereby the pin projects outwardly from the guide case 19.

In order to allow the aforementioned movement of the locking member 18, the structure shown in FIG. 10 is employed. Referring to FIG. 10, a cam member 23 is movable along the guide member 9. The cam member 23 is partially received in a hole 24 which is formed in the guide member 9, whereby the range of movement of the member 23 is defined by the length of the hole 24. The cam member 23 is provided with an inclined cam surface 25 for engaging the aforementioned engaging pin 21.

The cam member 23 is caused to move along the guide member 9 by an operating member 26. As shown in FIGS. 1 and 2, the operating member 26 is positioned on a forward end of the seat body 3 under the seat section 5. This operating member 26 is horizontally movably held by a guide sleeve 27 which is fixed to the seat body 3. The operating member 26 is coupled with the aforementioned cam member 23 by a wire 28. The wire 28 is covered with an outer tube 29, which is fixed to the guide sleeve 27 and the guide member 9 respectively.

When an operator frontwardly pulls the operating member 26, this movement is transmitted to the cam member 23 through the wire 28. Thus, the cam member 23 moves frontwardly with the operating member 26. Due to this movement of the cam member 23, the engaging pin 21 positioned on the cam face 25 is upwardly displaced as shown by a phantom line in FIG. 10. Consequently, the locking member 18 shown in FIG. 9 disengages the engaging projection 17 from the engaging hole 15, for example, against the elasticity of the spring 20. Thus, the guide member 9 becomes movable with respect to the guide rail 8. During this movement, the force applied to the operating member 26 may be removed. When the engaging projection 17 is aligned with any one of the engaging holes 15, 16, . . . , the locking member 18 is displaced by the spring 20 to insert the locking member 18 in the respective engaging hole 15, 16. Due to such displacement of the locking member 18, the engaging pin 21 engaging the cam face 25 forces the cam member 23 into the state shown in FIG. 10, so that the operating member 26 is returned to its original state.

Figure 11:
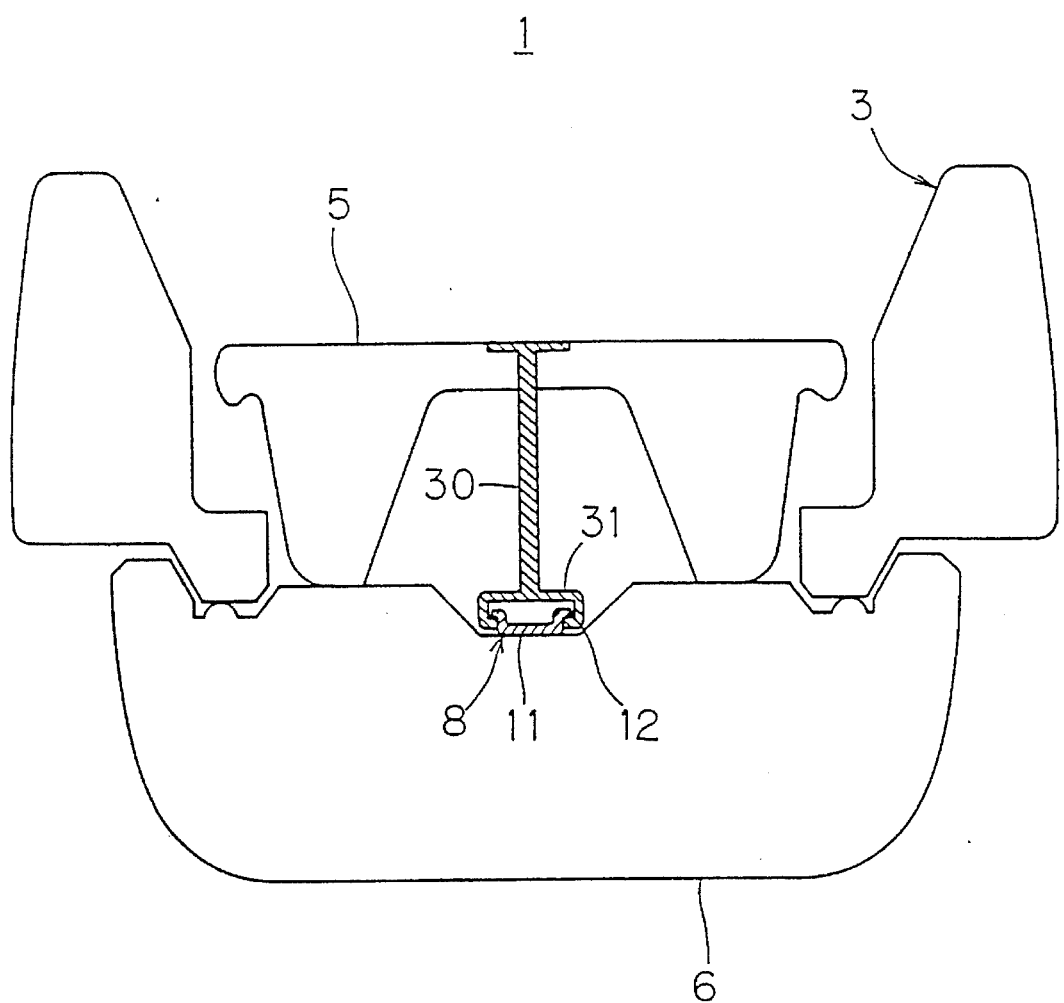
FIG. 11 is a sectional view schematically showing a structure for maintaining a seat section in a substantially constant inclination as viewed from a front portion of the child safety seat for an automobile.

A coupling for coupling the base 6 and the seat section 5 is provided in order to maintain the seat section 5 at a substantially constant inclination regardless of the aforementioned movement of the seat body 3. According to this embodiment, the coupling is formed by the aforementioned linear section 11 of the guide rail 8 and a coupling member 30 which is fixed to the seat section 5. FIG. 11 shows the relation between the guide rail 8 and the coupling member 30 as viewed from the front of the child safety seat 1. An engaging claw 31 is provided on a lower end of the coupling member 30, to engage the edges 12 of the guide rail 8. The engaging claw 31 has a lateral C-shaped section, similarly to the main part 13 of the guide member 9. This engaging claw 31 is movable along the linear portion 11 of the guide rail 8, while the coupling member 30 maintains the seat section 5 and the linear section 11 of the guide rail 8 at a substantially constant distance. Thus, it is possible to maintain the seat section 5 at a substantially constant inclination regardless of the aforementioned movement of the seat body 3 along an arcuate track, as understood from FIGS. 1 and 2.

While the present invention has been described with reference to the embodiment shown in the drawings, some modifications are available within the scope of the present invention.

For example, the positional relation between the guide rail 8 and the guide member 9 forming the relative movement guiding mechanism 7 may be reversed so that the guide rail 8 is provided on the seat body 3 and the guide member 9 is provided on the base 6. Further, the guide member 9 may be divided into a plurality of sections, to move along the guide rail 8 respectively.

The linear portion 11 of the guide rail 8 forming a part of the coupling for maintaining the seat section 5 at a substantially constant inclination may be provided by a member which is independent of the arcuate section 10 of the guide rail 8. While the coupling comprises the coupling member 30 which slides along the linear section 11 of the guide rail 8, the same may alternatively be replaced by a mechanism formed by a plurality of links which couple the seat section 5 and the base 6 with each other, for example.

Although the invention has been described with reference to specific example embodiments, it will be appreciated that it is intended to cover all modifications and equivalents within the scope of the appended claims.

What is claimed is:

1. A child safety seat for an automobile, comprising: a seat body (3) forming a backrest (2); a seat section (5) and a journal (4) tiltably securing said seat section (5) to said backrest (2) of said seat body; a base (6) movably holding said seat body, a relative movement guiding mechanism coupled to said seat body and to said base, said guiding mechanism comprising a guide rail (8) having a curved section (10) and a guide member (9) engaging said guide rail (8) for guided movement along said guide rail (8), said relative movement guiding mechanism further comprising a locking device (17, 18, 19, 20) for selectively fixing said guide member (9) in any one of a plurality of positions along said guide rail (8); and a coupling (30, 31) movably securing said seat section (5) to said base (6) for maintaining said seat section (5) at a substantially constant inclination when an angular position of said backrest (2) is changed in response to a movement of said seat body (3) relative to said base (6).

2. The child safety seat for an automobile in accordance with claim 1, wherein said guide rail (8) is secured to said base, and said guide member (9) is secured to said seat body (6).

3. The child safety seat for an automobile in accordance with claim 2, wherein said guide rail (8) further comprises a linear section (11) extending from an end of said curved section (10), and wherein said coupling comprises a coupling member (30) having a first end mounted to said seat section (5) and a second end (31) movably engaging said linear section (11) of said guide rail (8).

4. The child safety seat for an automobile in accordance with claim 1, wherein said guide rail (8) has a section with projecting edges along both sides thereof, said guide member (9) having a section with lateral edges for movably engaging with said first mentioned edges of said guide rail (8).

5. The child safety seat for an automobile in accordance with claim 1, wherein said locking device for selectively fixing said guide member (9) comprises a plurality of engaging holes (15) in said guide rail (8) and spaced from one another along said guide rail (8), and a locking member (17, 18) having an engaging projection (17) movably held by said guide member (9) for selectively engaging any one of said engaging holes (15).

6. The child safety seat for an automobile in accordance with claim 5, further comprising a spring (20) for urging said locking member (18) to move in a direction for inserting said engaging projection (17) in any one of said engaging holes (15).

7. The child safety seat for an automobile in accordance with claim 6, further comprising a cam member (23) engageable with a part (21) of said locking member (18) and movable in a direction perpendicular to that of movement of said locking member (18) for driving said locking member (18) in a direction for disengaging said engaging projection (17) from any one of said engaging holes, and an operating member (26, 28) connected to said cam member (23) for driving said cam member (23) into a disengaging position.

8. The child safety seat for an automobile in accordance with claim 7, wherein said operating member (26, 28) is positioned under said seat portion.

9. The child safety seat for an automobile in accordance with claim 8, further comprising a wire (28) for coupling said operating member (26) and said cam member (23) with each other.

* * * * *